UNITED STATES PATENT OFFICE.

JULIUS A. PRATT, OF NEW ORLEANS, LOUISIANA, ASSIGNOR OF ONE-HALF OF HIS RIGHT TO WILLIAM WHANN.

MEDICAL COMPOUND.

SPECIFICATION forming part of Letters Patent No. 231,611, dated August 24, 1880.

Application filed July 24, 1879.

*To all whom it may concern:*

Be it known that I, JULIUS A. PRATT, a resident of the city of New Orleans, parish of Orleans, and State of Louisiana, have invented a certain new and useful Improvement in Medical Compounds; and I do hereby declare the following to be a full, clear, and correct description of the same.

This invention relates to a new compound for the cure of rheumatism, gout, nervous bilious headache, progressive locomotor ataxia, paralysis in its various forms, and other chronic or acute diseases too numerous to mention.

To prepare the compound, take of iodide of potassium, five parts; tincture of cimicifuga, fifty-six parts; wine of colchicum seed, twenty-eight parts; tincture of stramonium, two parts; tincture of opium, (camphorated,) five parts; and tincture of coffee, four parts. Thoroughly mix the same by shaking or otherwise, after which it is ready for use.

Directions: In all cases where there is great pain give to adults one tea-spoonful every four hours; children, half a tea-spoonful every four hours. Where the pain is not very severe, as in most chronic cases, one tea-spoonful three times a day will answer. Should the stomach be too much deranged, as is sometimes the case, take the medicine after first eating something.

Having described the manner of compounding my medicine, what I claim as new, and desire to secure by Letters Patent, is—

A medical compound composed of iodide of potassium, tincture of cimicifuga, wine of colchicum seed, tincture of stramonium, tincture of opium, (camphorated,) and tincture of coffee, in or about the proportions described, and for the purpose specified.

In testimony whereof I have hereunto signed my name.

JULIUS A. PRATT.

In presence of—
 WM. WHANN,
 PETER J. FINNEY.